April 23, 1968 W. H. LIGGETT ETAL 3,380,040
HYDRODYNAMIC BEARING SUPPORT FOR A MAGNETIC DRUM
Filed April 1, 1964 3 Sheets-Sheet 2

INVENTORS.
WILLIAM H. LIGGETT,
ALVIN L. FRANKEL,
BY
Walter R. Thiel
ATTORNEY.

April 23, 1968  W. H. LIGGETT ETAL  3,380,040
HYDRODYNAMIC BEARING SUPPORT FOR A MAGNETIC DRUM
Filed April 1, 1964  3 Sheets-Sheet 3

INVENTOR.
WILLIAM H. LIGGETT,
ALVIN L. FRANKEL,
BY
Walter R. Thiel
ATTORNEY.

United States Patent Office 3,380,040
Patented Apr. 23, 1968

3,380,040
HYDRODYNAMIC BEARING SUPPORT FOR
A MAGNETIC DRUM
William H. Liggett, Redondo Beach, and Alvin L. Frankel,
Los Angeles, Calif., assignors to Hughes Aircraft Company, Culver City, Calif., a corporation of Delaware
Filed Apr. 1, 1964, Ser. No. 356,439
6 Claims. (Cl. 340—174.1)

ABSTRACT OF THE DISCLOSURE

An information storage device includes a rotatable magnetic drum which is journaled by air bearings in both a radial and axial manner within a stationary structure which supports electromagnetic transducers. The axial and radial support is effected by hydrodynamic means which is aroused only when the drum rotates with respect to the support structure. Axial support is provided by means of a pair of end thrust plates which are secured to the support structure. Grooves are formed in the end thrust plates and face the end surfaces of the rotating drum. Ports are placed in the thrust plates to permit flow of the axial support fluid. Radial support is effected by placing the peripheral surface of the drum very close to the inner surface of the support structure so that a hydrodynamic fluid lubricant is produced upon rotation of the drum. The drum comprises a thin outer surface and a thin inner surface which are joined at their ends by flanges and the drum has a through opening so that it has the appearance of an enclosed annular chamber. The flanges act as the end surfaces of this drum which coact with the grooves in the thrust plates to provide the axial support of the drum. A rotor is secured to the inner surface of the drum and a stator is coaxially positioned within the rotor.

The prevent invention relates to information storage devices and more particularly to a device having a rotatable magnetic storage drum supported axially and radially by a load carrying film or layer of hydrodynamic lubrication.

In general, the term information storage relates to a process whereby information, such as electrical signals representative of discrete bits of information, typically of an analogue or digital form, are stored in a magnetic medium by means of an electromagnetic transducer. The number of bits of information which may be stored per linear inch of recording surface is limited, among other factors, by the gap or spacing of the pole pieces of the electromagnetic transducer from the recording surface of the magnetic medium. For example, in high density recording of the order of 500 bits per linear inch the gap width should be in the order of 280 microinches. Generally, the pole pieces include a common pole face surface having a gap traversing its width to separate the pole pieces so that the magnetic flux lines are set up between the pole pieces across the gap and encounter the recording surface to magnetize a predetermined portion.

In addition to the necessity of a small gap between the pole face surface and the recording surface in high density recording, a small gap is also a necessity to yield high resolution, when recording as well as when reading information out of the system, and to limit the magnetic flux spreading between the surfaces when the lines of flux, which fringe between the two pole pieces, magnetize a greater than desired portion of the recording surface.

In the past, many mechanical configurations of electromagnetic transducer and magnetic mediums have been attempted with varying degrees of success. The first, and perhaps most undesirable configuration for high density storage systems might be called "contact recording" since the pole face surfaces of the pole pieces of the electromagnetic transducer are in uninterrupted contact with the recording surface of the magnetic medium. While this configuration eliminates flux spreading inherent in the separation of the surfaces, it increases the problem of damage due to abrasion, chipping, and scoring of the pole face surfaces and the magnetic recording surface. Therefore these problems are minimized by utilizing a second configuration which may be called "out of contact recording" because the pole face surfaces are physically separated from the magnetic medium or recording surface by a precise accurately maintained gap. The mechanical problem of fixedly mounting a multiple of magnetic heads to maintain the pole face surfaces at a precise distance from the recording surface is staggering and the cost is prohibitive since temperature changes may account for a variation in the spacing of more than the desired width of the gap. To achieve the desired gap, considerable work has been done to develop systems wherein an extremely thin layer of hydrodynamic lubrication is used. One such system biases the pole face pieces into contact with the surface of the magnetic medium and maintains this contact during relative lateral motion of the surfaces until the resultant hydrodynamic effect develops a component of force which balances the biasing force at a predetermined constant spacing of the surface.

In another system utilizing a hydrostatic system, air is blown against the recording surface through a nozzle attached to each individual electromagnetic transducer. The Venturi forces, brought about by the escape of air from the space between the recording surface and the pole face surface, positions the electromagnetic heads out of contact with the recording surface at a distance dependent primarily upon the static air pressure.

While the above enumerated systems have many advantages which made their use desirable in certain applications, each of them is too complicated and complex for the compact lightweight information storage units incorporated into missile or satellite systems.

Accordingly, it is an object of the present invention to provide an improved information storage device which is small, lightweight and requires little, if any, maintenance.

A further object of the present invention is to provide an information storage device having increased memory capacity, environmental capability, higher reliability, and increased life.

A still further object of the present invention is to provide an improved storage unit having an accurately maintainable and easily reproducible gap between the pole piece surfaces of the electromagnetic transducer and the magnetic surface of the information storage drum.

A further object is to provide an improved information storage unit utilizing hydrodynamic lubrication to precisely maintain a gap between the pole piece surfaces of the electromagnetic transducer and the magnetic surface of the information storage drum.

A further object is to provide an improved information storage unit utilizing hydrodynamic lubrication to axially and radially support one information storage drum and to eliminate the use of mechanical support means.

Briefly, the improved information storage device of the present invention comprises a floating rotatable hollow cylindrical magnetic drum which is enclosed within a pressurized housing and includes a magnetically sensitive outer surface and an inner surface including the rotor element of an inside out electric motor. The drum is journalled and radially supported in a cylindrical support structure, having at least one electromagnetic transducer, by a hydrodynamic bearing and is axially positioned in the support structure by a pair of thrust plates having a plurality of hydrodynamic bearings. The drum and the rotor element are rotated by the application of electrical energy to a stator element of the electric motor which is circumscribed by the drum and which is coaxially positioned adjacent to the rotor element.

Other advantages of the invention will hereinafter become more fully apparent from the following description of the drawings which illustrate a preferred embodiment thereof, in which.

Figure 5:
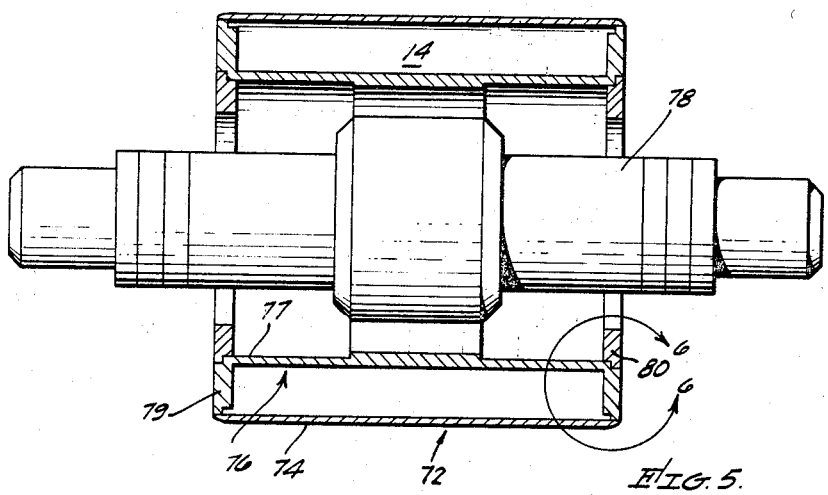
Figure 6:
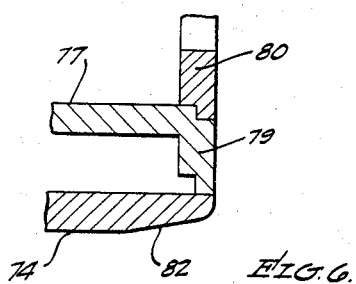

FIG. 5 is an enlarged longitudinal median sectional view of the magnetic drum assembly of the presently preferred embodiment of the present invention illustrating the various structural elements of the drum and a means for turning and balancing the drum; and FIG. 6 is an enlarged view of the portion of FIG. 5 encircled by the arrow 6—6 showing the shape of a portion of the outer and inner surfaces of the magnetic drum provided to control within operable limits the thermal and centrifugal distortions of the outer surface.

Figure 1:
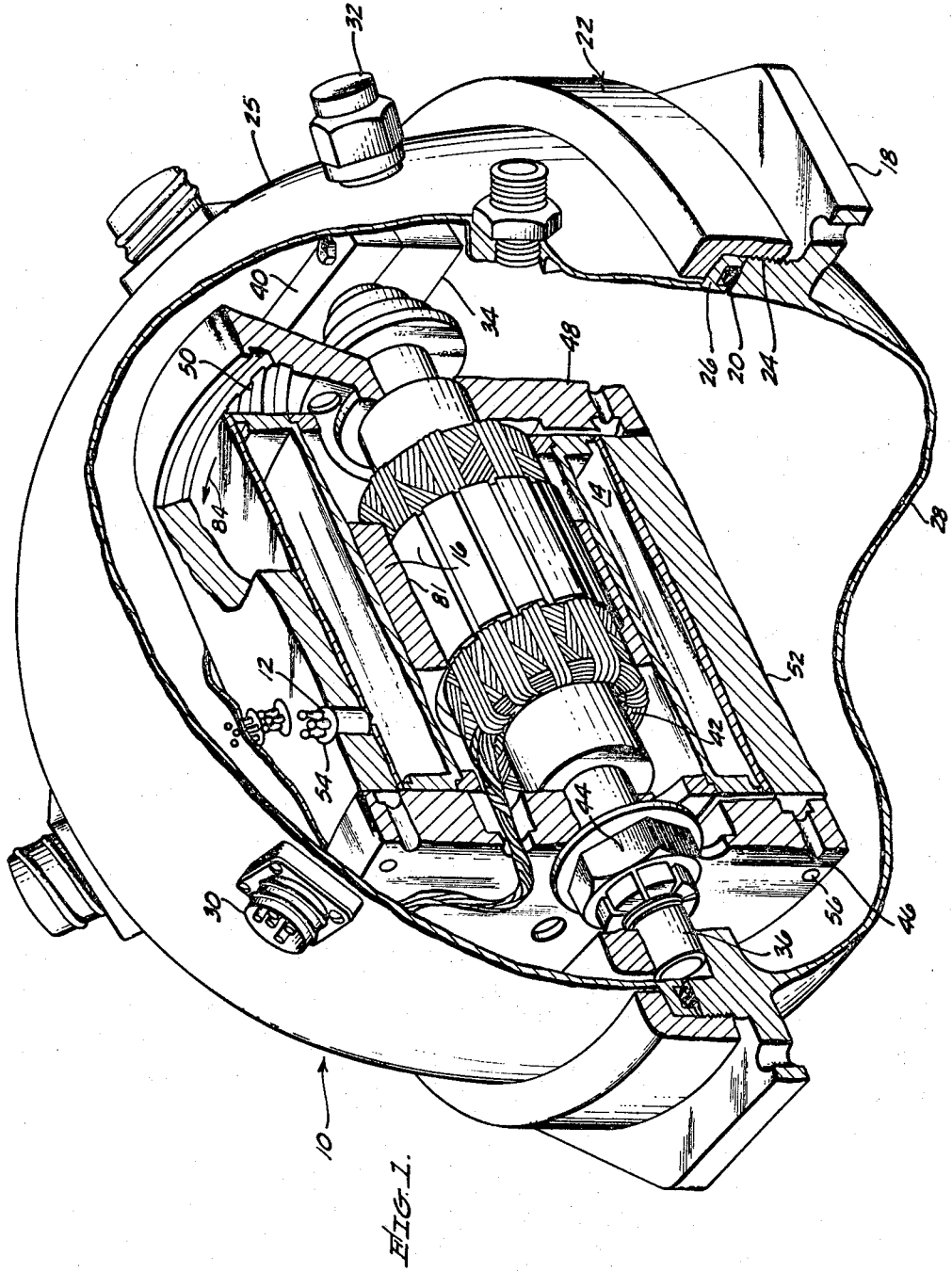
FIGURE 1 is a perspective view of the presently preferred embodiment of the information storage device of the present invention having a portion of the housing, the magnetic drum, the support structure and the solid and flexible thrust plates cut away to illustrate the relative positioning of the various elements.

Referring first to FIG. 1, there is shown one configuration of a housing or casing 10 for a plurality of electromagnetic transducers 12, an information storage drum 14 and an electric motor 16. The housing 10 is generally of a material, such as aluminum, having first and second parts 25, 28 which are hermetically sealed with a conventional O-ring 20 by means of a threaded retaining ring 22 that engages a threaded portion 24 on the second part 28 and by a securing flange 26 on the first part 25. A flange 18 extends from part 28 for mounting housing 10 to a support. In this embodiment the first part 25 is shown to include a plurality of electrical connectors 30 and pressure fittings 32 to enable suitable electrical conductors and pressure supply sources to be connected to the housing. It should be understood that, while the connectors 30 and the fittings 32 have been shown mounted on the first part 25 in specified geometric arrangement, they may be mounted in different locations on the first part 25 or on the second part 28 without varying from the teachings of the invention.

An elongated shaft 36 is rigidly secured between a clamp and bolt assembly 40 and flange or bracket 34 which may be formed as part of the housing or attached thereto by suitable means. A stator 42 of motor 16 is mounted on the shaft 36 intermediate the ends thereof and the stator is electrically connected by a plurality of conductors to one of the connectors 30. The motor 16 is shown to be a conventional induction motor of the inside out type; however, it should be understood that other types of electric motors, whether AC or DC, may be substituted therefor within the scope of this invention. Intermediate one end of the shaft 36 and the stator 42 and secured thereto by suitable retaining means such as a lock-nut and washer assembly 44 is a flexible thrust plate 46 and similarly secured at the other end of the shaft is a solid thrust plate 48. Each of the thrust plates 46, 48 includes a plurality of hydrodynamic spiral groove bearings 50 to be described in more detail later. A cylindrical hollow support structure 52 having a plurality of bores 54 and a material such as aluminum is secured to the thrust plates by a plurality of pins and screws 56. The structure 52 has an inside diameter of a dimension sufficient to enable the information storage drum 14 during operation to be hydrodynamically suported between the stator 42 and the support structure 52.

For a clearer understanding of the underlying principles inherent in the hydrodynamic axial support of the drum 14, the following is a brief description of these principles. Applying the fundamental principles of hydrodynamic gas bearings and assuming no side flow, the fluid mass rate of flow is constant along the axial length of the bearing or drum 14. Thus, when the journal or support structure 52 takes an eccentric position relative to the bearing, the film thickness varies sinusoidally around the journal. This means either or both the average velocity and the density of the film must vary inversely since from the continuity principle of fluid mechanics the product of the density of the lubricant, the velocity of the fluid and the thickness of the fluid film is a constant. Therefore, these velocity and density variations require the existence of pressure variations with integrated effect sufficient to support some load on the journal bearing. If it is assumed velocity variations compensate completely for the film thickness variations while the density remains constant, the theory is exactly the same as that for a liquid lubricant such as oil. This incompressible lubrication is the "hydrodynamic wedge." One of its important characteristics in lubrication of journal bearings is that the minimum film thickness occurs 90° away from the load line. However, if density alone varied to compensate for film thickness variations, while the average velocity remained constant, the point of minimum film thickness would occur in line with the load, as if the gas film were being compressed as an elastic solid. The high density at minimum film thickness must be associated with a high pressure, while the low density at maximum film thickness must be associated with a low pressure. Both the hydrodynamic wedge and the compression effect occur in a hydrodynamic gas bearing. The wedge produces a supporting component for the drum 14 90° away from the minimum film thickness, and the compression effect produces a supporting component for the drum 14 in line with this film thickness.

Figure 2:
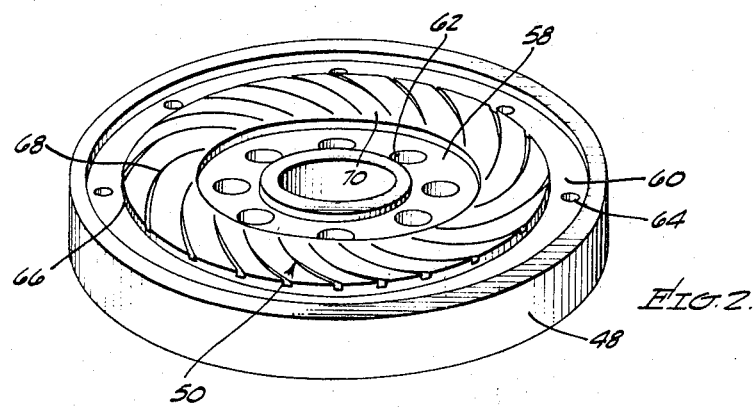
FIG. 2 is an enlarged perspective view of the entire solid thrust plate of FIG. 1 illustrating the arcuate groves of the hydrodynamic bearings.

Referring now to FIG. 2, the solid thrust plate 48 is of a material such as aluminum or brass and includes an inner and an outer circular manifold groove 58, 60 each including a plurality of ports or bores 62, 64, respectively, and a bearing ring 66 therebetween. The spiral groove bearing 50 comprises a plurality of equally spaced arcuate grooves 68 typically such as twenty each having a with of 1/16 of an inch and a depth of .001 of an inch. Each of the grooves 68 is of a length sufficient to enable it to extend from the outer manifold 60 to a point substantially three-quarters of the width of the bearing ring 66, thereby leaving an unsegmented portion 70. The outer manifold 60 typically has a depth in the order of .100 of an inch while the inner manifold 58 typically has a dimension of .050 of an inch and the solid thrust plate 48 typically has a thickness of .400 of an inch. This provides a rigid thrust plate since the cross-sectional area is relatively uniform, because the depth of even the deepest manifold grooves is only 25% of the thickness of the plate. In contrast, referring to FIGS. 3 and 3a, the flexible thrust plate 46 is substantially the same as the solid thrust plate 48 having the same thickness and including the same configuration of manifold grooves, bearing ring and arcuate grooves; however, to provide the flexibility, the inner manifold groove 58a has a depth of approximately .368 of an inch to leave a narrow wall 61 of only .032 of an inch between the bottom of it and the outer surface of the plate. Thus, a means for controlling the deflection of the support structure is provided and any force acting upon the support structure tending to cause it to deflect will first cause a deflection of the narrow wall 61 of the flexible thrust plate 46, since it is the structure of least cross-sectional area.

Referring now to FIG. 5, the information storage drum 14 is cylindrically shaped, with both ends open to form a through opening therein and of a material such as aluminum. The drum 14 includes a hollow wall 72 with an outer member 74 and an inner member 76. A coating or layer of a magnetic sensitive material of increased hardness and improved coercivity and retentivity such as one of the cobalt phosphorous alloys is placed on the peripheral face of the outer member 74. The inner member 76 comprises a relatively thin portion 77 and a pair of flange portions 79 to which the outer member 74 is secured so that the drum 14 comprises an enclosed annular chamber. The flange portions 79 are of a width greater than said thin portion to provide a thrust surface on the ends of the drum. To permit turning and balancing, a mandrel 78 is secured to the inner surface 76 by a method such as "shrink fit", typically wherein one member is heated to 250° F. and the other cooled to −85° F. and then assembled and subsequently cooled. Thereafter, the mandrel 78 is removed and a rotor 81 (FIG. 1) of the electric motor 16 is shrunk into place without affecting the external finished dimension of the drum 14. This is accomplished by the appropriate proportioning of the length of the inner member 76 and the thickness of the thin portion 77 in relation to the length of the rotor 81. Since the operating clearances are very small the thermal advantages of the rotor 81 being directly disassociated from the magnetic sensitive surface permits a favorable thermal distribution since the majority of the heat transmitted from the motor in the drum will be dissipated along the proportioned length of the thin portion 77. To provide an increased area of thrust surface and hydrodynamic stiffness, a ring-like member 80 is secured substantially flush with the end of the drum to each of the flange portions 79 by a method such as electron beam welding. It has been found desirable to use electron beam welding not only to secure the rings 80 to the flange portions 79 but also to secure the outer member 74 to the flanges since by such a technique the extreme heat encountered during welding can be concentrated to a relatively small area thus minimizing the distortions of the drum surfaces.

In FIG. 6 is shown, for clarity, an enlarged view of one corner of the drum 14 illustrating the contour of the outer member, and the flange portion 79 to provide a means for controlling the differential expansion of the drum due to the heat generated by the motor and the centrifugal force during rotation. This particular configuration results from an application of the semi-infinite beam theory to cylindrical shells. A complete discussion of this theory may be found at pp. 141 through 170 of "Advanced Strength of Materials" by J. P. Den Hartog, First edition, 1952, McGraw-Hill Book Company, Inc. In particular, by adjusting the thickness of the outer member 74 and choosing a material for the member 74 having a specific modulous of elasticity, the deflection of the outer member 74 can be controlled to be substantially contained within a specific distance from the edge of the drum 14. Now, since the point along the surface of the outer member 74 at which a predetermined deflection or maximum allowable deflection can be calculated, the peak or ridge of a taper or beveled portion 82 is made to be at a point slightly farther from each edge of the surface than the calculated point. By this method undesired deflections of the surface of outer member 74 are confined in the beveled portion 82 without affecting the rest of the outer member 74.

In summary, the beveled portion 82 on either side of the member will deflect substantially to compensate for the thermal and centrifugal deflections of the inner member thereby controlling the deflection of the remaining portion of the surface. Since the beveled portions 82 are made by removing a predetermined portion of material from the outer member 74, any deflection thereof is calculated to be less than an amount to bring the outer member 74 into contact with the support structure 52, thus maintaining the gap therebetween at a precise width. As an example, one embodiment of the present invention includes a drum having a length of 2.997 inches and a pair of beveled portions having a length of .100 inch at an angle with the surface of the outer member of 2°.

To axially support the drum member 14, the spiral groove bearings 50 of the thrust plates 44, 46 provide hydrodynamic lubrication between the ends of the drum and the thrust plates. Generally, this is accomplished by the rotation of the drum in the direction of the curvature of the bearings, as depicted by rotational arrow 84, causing gas or other lubricating medium contained with the housing 10 to be forced into each of the arcuate grooves 68 and resulting in a pressure differential having a gradient with the highest pressure at the end of the groove adjacent the bearing ring 66. In this regard the bores 64 in the outer manifold 60 aid the bearings since they function as both intake and exhaust ports because the rotating ends of the drum pull air or a similar lubricating medium in through them into the arcuate grooves 68 while a portion of the air therein tends to leak out and through the holes, while the bores 62 in the inner manifold 58 function only to provide a means of air circulation for the electric motor 16.

Figure 3:
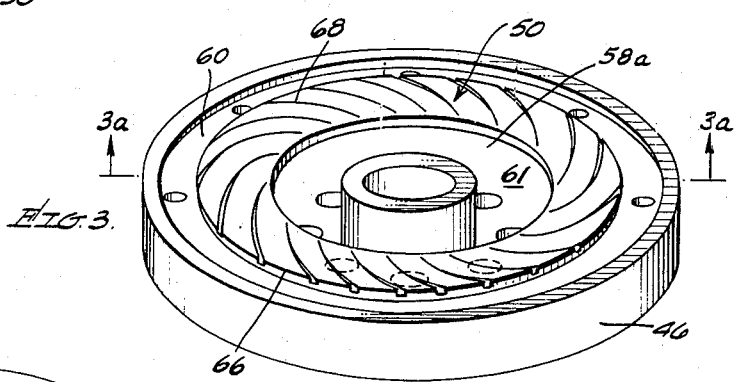
FIG. 3 is an enlarged perspective view of the entire flexible thrust plate of FIG. 1 illustrating the arcuate grooves of the hydrodynamic bearings.
Figure 3A:
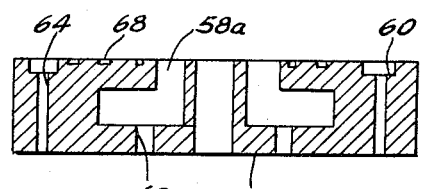
FIG. 3a is a cross-sectional view of the thrust plate of FIG. 3, taken along lines 3a—3a of FIG. 3.
Figure 4:
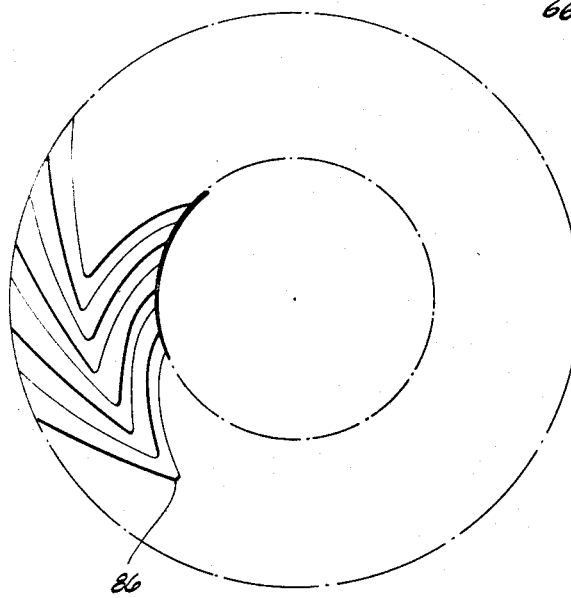
FIG. 4 is an enlarged sketch of the bearing ring of the solid and flexible thrust plates of FIGS. 2 and 3 illustrating a second embodiment of the grooves contained therein.

Shown in FIG. 4 is a sketch of a second configuration of the grooves of the hydrodynamic bearing shown in FIGS. 2 and 3 wherein the grooves are arrow or herringbone shaped rather than arcuate. These grooves will function in the same manner as the arcuate grooves except that in this configuration the highest point of the pressure gradient is at the tip of the arrow as indicated at 86 and the rotation of the drum member causes the air to advance into the groove from both manifolds, thus making the bores 62 in inner manifold 58 intake and output ports as well as the bores 64 in the outer manifold 60.

While primarily one embodiment of this invention has been herein illustrated, it should be appreciated by those skilled in the art that variations of the disclosed arrangement both as to its details and as to the organization of such details may be made without departing from the spirit and scope thereof. Accordingly, it is intended that the foregoing disclosure and showings made in the drawings may be considered as illustrative of the principles of this invention and not construed in a limiting sense.

What is claimed is:
1. An information storage device comprising:
a support structure including a pair of end plates;
a rotatable member having a magnetically sensitive material journalled within said support structure;
at least one electromagnetic transducer supported by said support structure and adapted to be magnetically coupled to said magnetically sensitive material;
rotation producing means coacting with said rotatable member to produce rotation thereof; and
supporting means formed on said end plates and on said rotatable member to provide hydrodynamic lubrication between said end plates and the ends of said rotatable member for axially supporting said rotatable member upon rotation thereof and between said support structure and the periphery of said rotatable member for radially supporting said rotatable member upon rotation thereof.

2. A device as in claim 1 wherein said rotatable member comprises spaced inner and outer members and a pair of end portions secured thereto to form an enclosed annular chamber, said magnetically sensitive material being coated on said outer member.

3. A device in claim 1 wherein said supporting means comprises hydrodynamic bearing and port means in said end plates positioned adjacent to the ends of said rotatable member to provide axial support therefor.

4. An information storage device comprising:
a pressurized housing;
a shaft supported in and by said housing;
a pair of end plates supported by said shaft;
a support structure including a plurality of bores and having an elongated inner surface secured to said end plates; and
an elongated drum-like rotatable member circumscribed by said support structure and journalled within said support structure, said rotatable member being open at both ends and having two end surfaces and inner and outer members to form an enclosed annular chamber, said outer member having a coating of magnetizable material on the periphery thereof;
a plurality of electromagnetic transducers each positioned in each of said bores and adapted to be magnetically coupled to said coating of magnetizable material;
an electric motor including a stator member mounted on said shaft and a rotor member adjacent to said stator member and in rigid engagement with said drum-like rotatable member to provide rotation of said rotatable member; and
supporting means for axially and radially supporting said rotatable member within said support member and comprising close spacing means between said elongated inner surface and the periphery of said elongated drum-like member to form pressurized hydrodynamic lubrication between said outer member and said support member upon rotation of said drum-like member for radial support of said drum-like member and further comprising groove means in said end plates to form pressurized hydrodynamic lubrication between said end plates and said end surfaces of said drum-like member upon rotation thereof for axial support thereof.

5. An information storage device comprising:
a pressurized housing;
a support in and means supported by said housing;
a pair of end plates secured to said support means;
a hollow support structure including a plurality of bores and engaging said support means;
a rotatable member journalled within said support structure, said rotatable member being open at both ends and having two end surfaces and inner and outer members to form an enclosed annular chamber, said outer member including a coating of a magnetizable material on the peripheral face thereof;
a plurality of electromagnetic transducers each contained in each of said bores and adapted to be magnetically coupled to said coating of magnetizable material;
driving means including a stator member mounted on said support means and a rotor member secured to the inner member of said rotatable member;

a radial hydrodynamic bearing means between said outer member and said support structure and having the peripheral face of said rotatable member forming the journal portion thereof for maintaining a precise spacing between said peripheral face of said rotatable member and said hollow support structure;
an axial hydrodynamic bearing means including a plurality of step bearings on said end plates adjacent to a different one of the two end surfaces of said rotatable member; and
port means in said end plates coacting with said step bearings.

6. An information storage device comprising:
a pressurized housing;
a shaft supported in and by said housing;
a support structure including a cylindrical member having an inner surface and a pair of end thrust plates supported by said shaft and having a plurality of bores in said cylindrical member;
a drum-like rotatable member circumscribed by said support structure and journalled within said support structure, said rotatable member having a through opening and having two end surfaces and inner and outer members to define an enclosed annular chamber, said outer member having a coating of magnetizable material on the peripheral face thereof;
a plurality of electromagnetic transducers each positioned in each of said bores and adapted to be magnetically coupled to said coating of magnetizable material;
an electric motor including a stator member mounted on said shaft and a rotor member adjacent to said stator member and in rigid engagement with said drum-like rotatable member to provide rotation of said rotatable member;
a radial hydrodynamic bearing means between said peripheral face of said drum-like member and said inner surface of said support structure for maintaining a precise spacing therebetween;
an axial hydrodynamic bearing means comprising a plurality of step bearings having arcuate grooves on said thrust plates and positioned adjacent to said end surfaces of said drum-like member; and port means in said end plates coacting with said arcuate grooves to establish a pressure gradient therein upon rotation of said drum-like member.

References Cited
UNITED STATES PATENTS

| | | | |
|---|---|---|---|
| 2,729,106 | 1/1956 | Mathiesen | 340—174.1 |
| 2,976,371 | 3/1961 | Bell | 179—100.1 |
| 3,027,471 | 3/1962 | Burgwin | 310—67 |
| 3,030,452 | 4/1962 | Uritis | 340—174.1 |
| 3,140,474 | 7/1962 | Leshner | 340—174.1 |

BERNARD KONICK, *Primary Examiner.*

R. SNIDER, *Assistant Examiner.*